Figure 1:
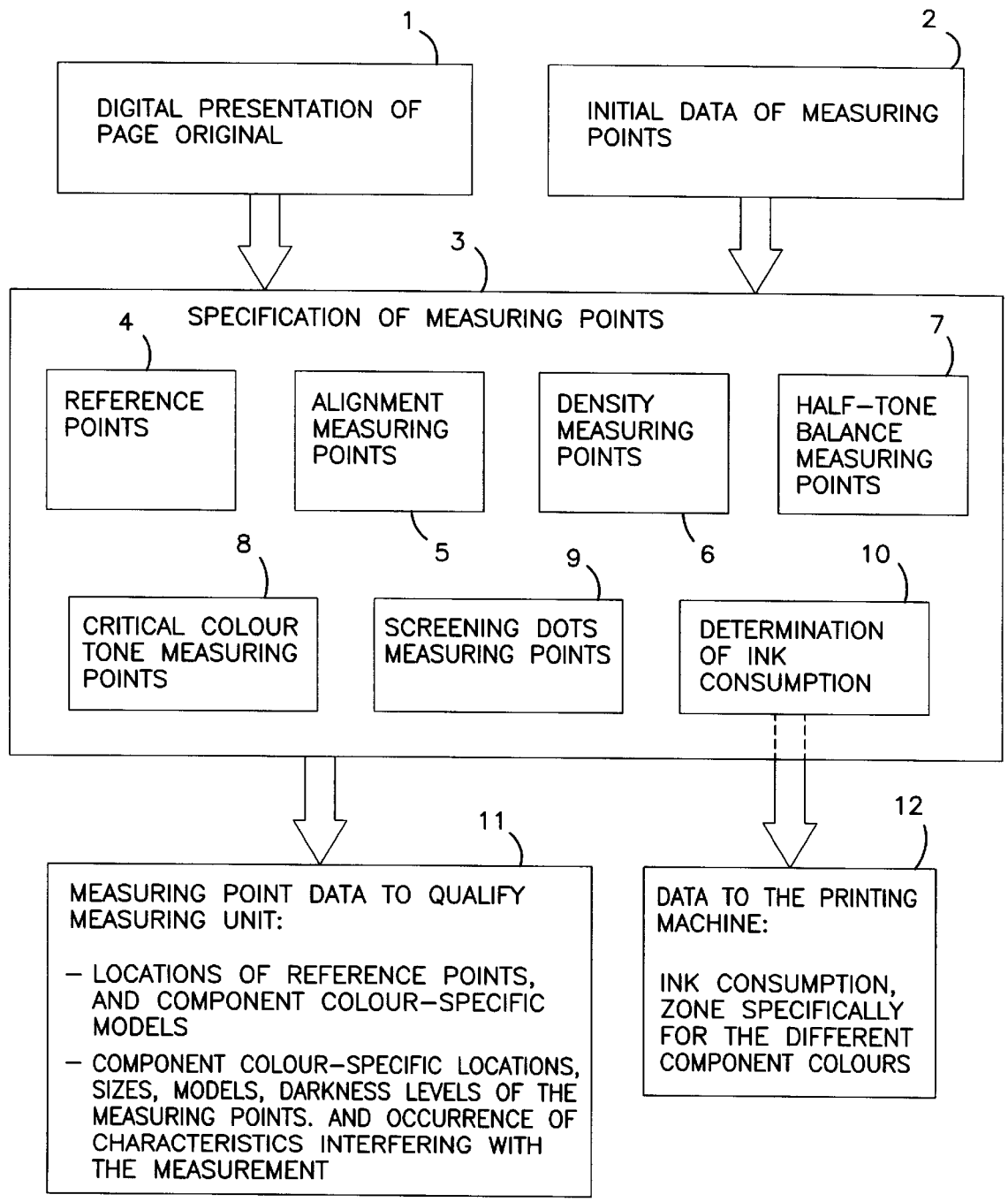

United States Patent [19]

Kuusisto et al.

[11] Patent Number: 5,774,635

[45] Date of Patent: Jun. 30, 1998

[54] PROCEDURE FOR CONTROLLING PRINTING QUALITY

[75] Inventors: Matti Kuusisto; Raimo Launonen; Caj Södergård, all of Espoo, Finland

[73] Assignee: Insinööritoimisto Data Oy, Helsinki, Finland

[21] Appl. No.: 553,476

[22] PCT Filed: Apr. 26, 1994

[86] PCT No.: PCT/FI94/00160

§ 371 Date: Oct. 23, 1995

§ 102(e) Date: Oct. 23, 1995

[87] PCT Pub. No.: WO94/25278

PCT Pub. Date: Nov. 10, 1994

[30] Foreign Application Priority Data

Apr. 26, 1993 [FI] Finland ..................................... 931876

[51] Int. Cl.⁶ .............................. H04N 1/46; G03F 3/08; G03F 15/00
[52] U.S. Cl. .......................... 395/106; 395/102; 395/109; 395/114; 358/500; 358/518; 358/523; 382/112; 382/239
[58] Field of Search .................................... 395/106, 109, 395/102, 131, 114; 358/500, 518, 523; 382/112, 239, 287; 101/211, 365, 483, 484

[56] References Cited

U.S. PATENT DOCUMENTS

| | | | |
|---|---|---|---|
| 4,244,655 | 1/1981 | Asai et al. | 356/404 |
| 4,665,496 | 5/1987 | Ott | 364/526 |
| 4,685,139 | 8/1987 | Masuda et al. | |
| 4,852,485 | 8/1989 | Brunner | 101/211 |
| 4,874,247 | 10/1989 | Watanabe et al. | 356/402 |
| 5,023,656 | 6/1991 | Terashita | 355/77 |
| 5,108,186 | 4/1992 | Kipphan et al. | 356/380 |
| 5,122,977 | 6/1992 | Pfeiffer | 364/551.01 |
| 5,125,037 | 6/1992 | Lehtonen et al. | 382/239 |
| 5,144,566 | 9/1992 | Anderson et al. | |
| 5,155,598 | 10/1992 | Ramekers et al. | 358/298 |
| 5,289,227 | 2/1994 | Kinjo | 355/77 |
| 5,530,656 | 6/1996 | Six | 101/211 |

FOREIGN PATENT DOCUMENTS

| | | |
|---|---|---|
| 2088816 | 8/1993 | Canada . |
| 0194331 | 9/1986 | European Pat. Off. . |
| 0443062 | 8/1991 | European Pat. Off. . |
| 0461338 | 12/1991 | European Pat. Off. . |
| 0554811 | 8/1993 | European Pat. Off. . |
| 78025 | 2/1989 | Finland . |
| 2249993 | 5/1992 | United Kingdom . |
| WO 89/01867 | 3/1989 | WIPO . |

*Primary Examiner*—Edward L. Coles, Sr.
*Assistant Examiner*—Mark Wallerson
*Attorney, Agent, or Firm*—Merchant, Gould, Smith, Edell, Welter & Schmidt

[57] ABSTRACT

Prior to printing a plurality of measuring points are specified from the digital presentation of the page original on the basis of given initial data. The initial data for the measuring points are set so that at least two measuring points are locating points on the basis of which the other measuring points can be located. The other initial data are set according to what one desires to measure on the printed page. Thereafter, the locating points and other specified measuring points are sought in the digital presentation of the page original; and the measuring point data are entered in the printing quality measuring unit. The results of measurement from the measuring points are compared with the measuring point data from the digital presentation of the page original, or the objective values, and the results of comparison are used to adjust the printing machine.

14 Claims, 2 Drawing Sheets

PROCEDURE FOR CONTROLLING PRINTING QUALITY

The present invention concerns a procedure for controlling printing quality, as specified in the preamble to claim 1.

BACKGROUND OF THE INVENTION

It is conventional practice in printing technology to measure the darkness of the printing on a printed specimen, and the alignment with each other of different colours, and to use the results of measurement towards such adjustment of the printing machine that printed products of good quality will be achieved.

In currently applied quality measuring methods, test marks are printed in different colours on the side of the printing proper, their location or their darkness being measured in order to determine the quality. Such test marks are usually printed outside the actual printing area, and outside the area of the printed product, in the marginal area of the paper web or sheet, which is trimmed off later. The problem encountered in the use of such measuring marks is that they cannot always be positioned in marginal areas which are to be trimmed off later, and they are instead placed among the printing proper. This is usually the case e.g. in newspaper printing. In that case, however, the measuring marks will be visible in addition to the printing, whereby they impair the printing quality. Another problem is the extra work at the prepress stage caused by the use of separate measuring marks.

The quality-related problem just outlined can be reduced by using measuring and density marks smaller than before and by combining these, as has been described e.g. in the Patent FI-78025. It is to be noted, however, that even these measuring marks will be visible if they are placed among the printing proper.

SUMMARY OF THE INVENTION

The object of the invention is to eliminate the problems just mentioned. The object of the invention is, specifically, to provide a simple and advantageous printing quality measuring method which can be employed towards versatile quality monitoring in conjunction with any kind of printing machine, independent of the product which is being printed.

DESCRIPTION OF THE INVENTION

The procedure of the invention for controlling printing quality is characterized by that which has been stated in the claims following below.

The invention relates to a procedure for controlling printing quality in which the digital presentation of the page original is utilized. The digital presentation of the page original is obtained, for instance, from an electronic page-making system or by making an image of the page original, film or printing plate and digitizing the image.

The starting point of the printing control method of the invention is that prior to the printing process a number of measuring points are determined from the digital presentation of the page original, on the basis of given initial data. The initial data contain one or several definitions. With the aid of these definitions, one finds a point of measurement e.g. in a predefined area of the page to be printed presenting e.g. the desired level of darkness (e.g. screen pattern percentage). Furthermore, the desired sizes of the measuring points are given in the initial data. The measuring points are, most advantageously, rectangular areas. One may furthermore in the initial data set the desired number of measuring points and the allowable tolerances of the measuring points. On the basis of these initial data, suitable measuring points are sought in the digital presentation of the page original.

Two at least of the measuring points are locating points on the basis of which all other measuring points can be located on the printed page or in any corresponding area. Such locating points are characterized by having in different component colours such details which do not occur in the immediate adjacency of these points, and said details consisting, to greatest advantage, of sharpest possible darkness variations with heavy contrast (borders or equivalent) with a view to facilitating location both vertically and horizontally. The rest of the initial data are set in accordance with the kind of measurements one desires to implement with a view to printing quality control.

The measuring point initial data are set in accordance with which of the following measurements are desired: measurement of colour alignment, density measurement, microquality measurement, half-tone balance measurement, measurement of critical tones of colour, and measurement of ink consumption. In measuring colour alignment the measuring points employed in location can be utilized. On the basis of the initial data given, the locating points and other measuring points that have been determined are sought in the digital presentation of the page original. The search for the measuring points is accomplished employing image processing and shape-identifying methods known in themselves in the art. Once suitable measuring points have been determined and found, the detailed data relating to these measuring points are entered in a printing quality measuring unit.

In connection with printing the page, the actual measurements are effected. One seeks on the printed page, or in an equivalent area, in connection with the actual measuring event, first, the locating points and, thereafter, with their aid the rest of the measuring points, performing thereafter the measurement at the respective points and forwarding the results of measurement, on the side of the measuring point data, to the quality measuring unit. The results of measurement from the measuring points are compared with the measuring point data specified in the digital presentation of the page original, i.e., with the objective values, and deviations describing the printing quality are determined. The deviations from the objective values which have been preset are used to adjust the printing machine so that the printed products will meet the quality requirements that have been set.

In the proper measuring event, the printed page or equivalent is most advantageously imaged in a way known in itself in the art, using an electronic camera, and the image is stored in memory in digital form. Of the printed page or equivalent most advantageously the desired area is imaged, where measuring points are known to be found. The measuring points that have been imaged are analyzed with reference to the objective values of the page original's measuring points for determining the quality of printing, as described in the foregoing.

The advantage of the invention is that there is no need to provide any particular test marks in the printing, such as a printed page or area; all measurements are rather made from the actual printing by comparing the values measured at certain predefined measuring points in relation to the objective values that have been set, said objective values having been defined directly from the digital page original.

It is a further advantage of the invention that the measuring points and the objective values can be automatically and/or partly manually be determined to be as favourable as possible in view of the original, or the true objective. In the following the invention is described in detail, referring to the drawing enclosed, wherein:

BRIEF DESCRIPTION OF THE PREFERRED EMBODIMENTS

Figure 2:
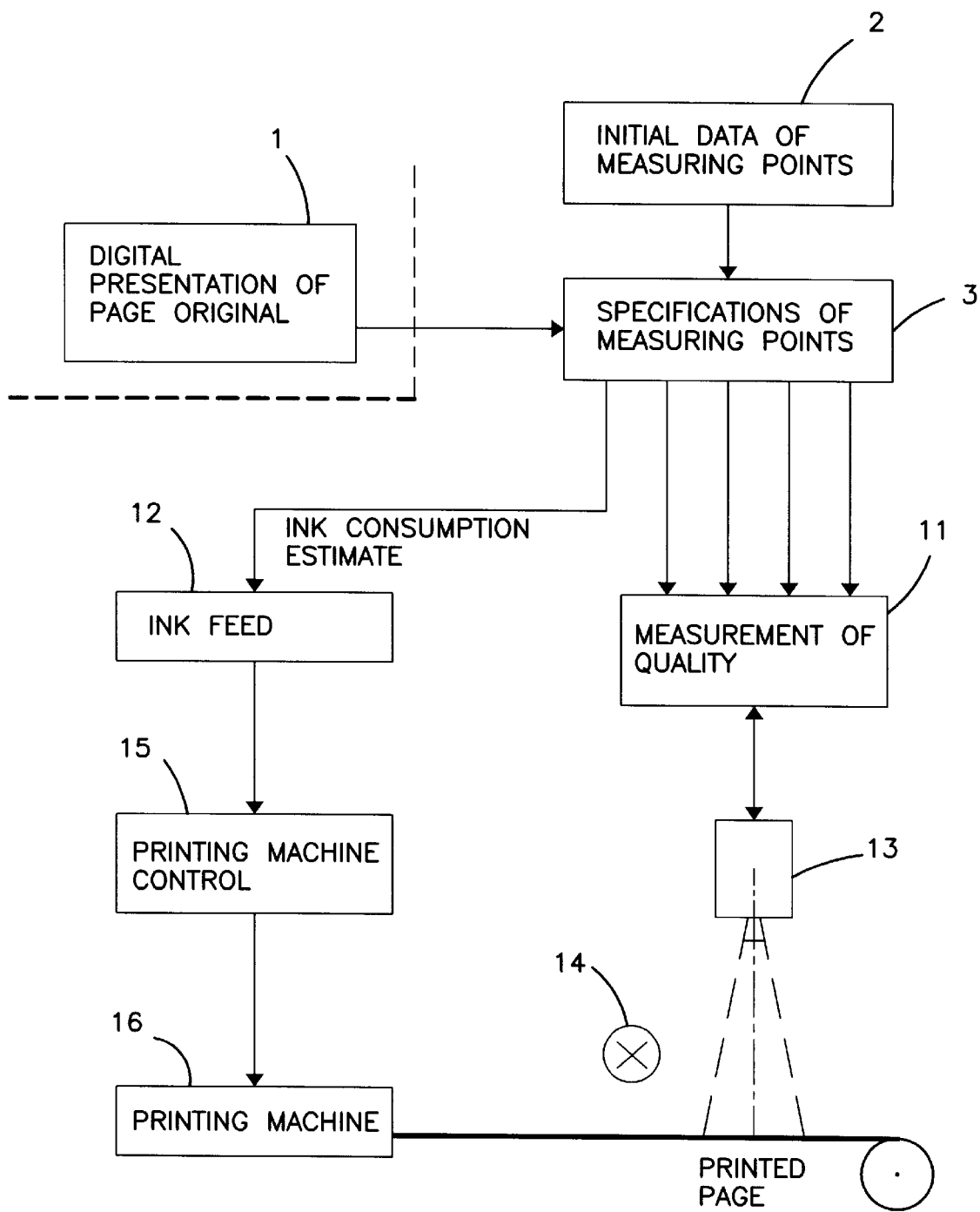

FIG. 1 presents, in the form of a block diagram, the specifying of the measuring points and their storing in the quality measuring unit;

FIG. 2 presents, in the form of a block diagram, a procedure according to the invention for controlling printing quality and for controlling a printing machine employing the procedure.

The starting point of the printing quality control method of the invention is that of one page of the printed product has been formed a digital presentation of the kind commonly used in conjunction with modern printing machines. Such a digital presentation of the original page (page original) is, for instance, obtained from the page-making system in the page defining unit 1, or it may be a digital page presentation prepared by means of a publishing programme, such as e.g. a Postscript presentation. Such a digital presentation of the page original contains all requisite information for doing the printing of a page, e.g. colour separation.

The initial data for specifying the measuring points are compiled in a suitable initial data unit 2 in FIG. 1. The specifications of the initial data depend on the kind of measurements one desires to carry out. The determinations of initial data in an advantageous detailed formulation are presented in the attached Appendix 1. This appendix shows the data to be entered in the initial data unit 2 and the data which can be taken out from the measurement data specifying unit 3, upon specifying the measuring points, and entered in the quality measuring unit 11.

The digital presentation of the page original is supplied from the page defining unit 1 to the measuring point specifying unit 3 together with the specification data obtained from the initial data unit 2. On the basis of the initial data, the locating points 4 are found in the digital presentation of the page original and, on the basis thereof, the rest of the measuring points, or in the present case the alignment measuring points 5, density measuring points 6, halftone balance measuring points 7, critical colour tone measuring points 8, screen dots measuring points 9, or points for microscopic measurements, and ink consumption determination 10 is made.

After the measuring points have been determined in the measuring points specifying unit 3, the data concerning the measuring points and their characteristics are entered in the quality measuring unit 11. The locations of the locating, or reference, points and the component colour-specific models are stored in the memory of the quality measuring unit 11. Furthermore there are stored the component colour-specific locations, sizes, models, density levels (e.g. screen percentages) of the measuring points and the occurrence of characteristics interfering with measurement (e.g. in density measurement, occurrence in the measuring area of another component colour). These data may be stored in the form of model images of the measuring points so that they contain all the requisite information for each measuring point.

The ink consumption determining data are advantageously supplied directly to the printing machine, i.e., to the presetting of the ink feed unit 12. The ink consumption is determined zone-specifically for the different component colours.

FIG. 1 illustrates the specifying of measuring points and the setting in the quality measuring unit of the information which they hold. The measuring event proper can be elucidated with the aid of FIG. 2. Transformation of the page original into digital presentation takes place in the page defining unit 1, whence the data are carried to the measuring points specifying unit 3. The initial data are specified in the initial data specifying unit 2, whence they too go to the measuring points specifying unit 3. The ink consumption determining data are supplied from the measuring points specifying unit 3 to the ink feed unit 12 of the printing machine. The position information of the measuring points is further supplied from the measuring points specifying unit 3 together with the contents thereof to the quality measuring unit 11, as was already observed in the foregoing.

At commencement of the printing process, the printed page or equivalent is imaged with an electronic camera 13, preferably a CCD matrix camera, which can be moved relative to the printed page if necessary. In addition to the camera 13, an illuminating apparatus 14 is used, this apparatus being for instance a stroboscopic lighting means 14. The electronic camera 13 is used to make an image of the printed page, and on the page the measuring points are sought, their images being carried directly to the quality measuring unit. From the image of each measuring point the requisite measuring data are determined, and these are compared with the measuring point data in the digital presentation of the page original, the deviations being fed to the printing machine control unit 15, which on the basis of the data it obtains adjusts the printing machine 16 when necessary.

In the foregoing the invention has been described by reference to various system units. It goes without saying that the system units can, in part at least, be implemented by means of software in conjunction with one or several data processing units, such as a microprocessor and memory units thereto connected.

The invention is not exclusively limited to relate to the embodiment example presented in the foregoing, many modifications being feasible within the scope of the inventive idea defined by the claims.

APPENDIX 1

SPECIFICATION OF THE MEASURING POINTS' INITIAL DATA

1. Location of the origin of the measuring coordinates

Reference points:

Specification of two reference points for matching the original coordinates and the measuring coordinates. The reference point is a rectangular area containing such details which do not occur in its vicinity (border of an illustration or a letter character, etc.). It must be possible to find the corresponding area on the printed page e.g. with the aid of a normalized correlation algorithm or another model fitting algorithm.

The lateral location of the point must lie between two given x coordinates.

Initial data:

x coordinates of allowed areas (in mm);

Maximum size of the model area (in mm*mm);

Scale of the model areas (mm/pel; pel=pixel);

Data going to the quality measuring unit:

Coordinates of the model areas' top left corners (in mm);

Model areas (Dimensions in pel*pel and mm*mm).

2. Density measuring points
   Location:
   (1) The printed page is divided into colour zones in the vertical or horizontal direction of the page. The zones have equal width. The number of colour zones is entered as a programme parameter.

OR (2) The x coordinates of each colour zone are entered as a programme parameter.

One measuring point per printing ink colour (cyan C—magenta M—yellow Y—black K) is specified in each zone.

The maximum difference of the x coordinates of ink colour (C-M-Y-K) is entered as a programme parameter. The spacing of y coordinates of ink colour (C-M-Y-K) must not be less than y mm (y is entered as programme parameter)

Number of measuring points:
   The number of colour zones is entered as a parameter.

Size of measuring points:
   The maximum size of the rectangular measuring points is entered as a programme parameter.

Types of measuring points:
   The ink density/grade of darkness (or screening) must be uniform (constant), and the point must be free of other inks, or the grade of darkness of any other inks should be as low as possible. In the latter case the measuring point of one ink colour must be free of any other ink colours.

The required screening (in %) is entered as a programme parameter.

Initial data:
   Number of colour zones OR Coordinates of the colour zones (in mm);
   Printing colours (C,M,Y,K);
   Allowed range of variation of x coordinates (in mm):
   Minimum spacing of y coordinates (in mm);
   Minimum size of measuring point (in mm*mm):
   Screening (in %+–%).
   Data going to the quality control unit:
   Coordinates of measuring points (in mm);
   Measuring point sizes (in mm*mm);
   Printing colours (C,M,Y,K);
   Screening (in %);
   Overlaying printer's ink, if any, (ink colour and screening).

3. Alignment measuring points
   Location:
   The measuring points must be located within a given colour zone. The x coordinates of each colour zone are entered as a programme parameter. The maximum lateral distance between points is limited to the value x, entered as a programme parameter. The spacing of the y coordinates must be within y1 to y2 mm (parameters to be entered in the programme).

Number of measuring points:
   Max N–1, where N is the number of colours printed. The number of points must be minimized.

Size of measuring points:
   The variation range of the size of the rectangular measuring points is entered as a programme parameter.

Types of measuring points:
   The printing colour combinations of the measuring points must be selected so that the alignment error for each colour can be measured with reference to APPENDIX black (the reference colour).

At any measuring point there must be present:
   (a) two or more non-overlapping details printed with different ink colours. No identical details must occur in their vicinity, in order that they could be found on the printed sheet. The screening of the details must be higher than X%. OR
   (b) one detail printed with two overlapping colours, and the detail can be seen in both component colours. The screening of the details must be within X1 to X2%. OR
   (c) one detail printed with all colours, and the detail can be seen in all component colours. The areas close to the detail must be free of any other printing. The screening of the details must be less than X%.

Initial data:
   Coordinates of the colour zones (in mm);
   Allowed variation of x coordinates (in mm);
   Maximum and minimum spacing of y coordinates (in mm);
   Size range of measuring points;
   Printing colours (C,M,Y,K);
   Scale of models (mm/pel);
   Allowed screening (in %).
   Data going to the quality control unit:
   Coordinates of measuring points (in mm);
   Models (pel*pel and mm*mm);
   Pertinent colours (C,M,Y,K).

4. Microscopic measuring points
   Location:
   (1) The printed page is divided into colour zones in the vertical or horizontal direction of the page. The zones have equal widths. The number of colour zones is entered as a programme parameter. OR
   (2) The x coordinates of each colour zone are entered as programme parameters.

One measuring point per printing colour (C-M-Y-K) is specified in each zone. The maximum difference of ink colour (C-M-Y-K) x coordinates is entered as a programme parameter. The spacing of ink colour (C-M-Y-K) y coordinates must be y mm at least (y entered as parameter).

Number of measuring points:
   The number of zones is entered as parameter.

Size of measuring points:
   The minimum size of the rectangular measuring points is entered as programme parameter.

Types of measuring points:
   The measuring point must be free of other colours, and the screening must be uniform and in the range X1 to X2%.

Initial data:
   Number of colour zones OR x coordinates of the colour zones (in mm);
   Printing colours (C,M,Y,K);
   Allowed variation ranges of x coordinates (in mm);
   Minimum spacing of y coordinates (in mm);
   Minimum size of measuring point (in mm*mm);
   Allowed screening (in %).
   Data going to the quality control unit:
   Coordinates of measuring points (in mm);
   Measuring point sizes (in mm*mm);
   Printing colours (C,M,Y,K);
   Screening (in %).

5. Measurement of colour distribution
   Location:

The printed page is divided into x*y rectangular areas. x and y are entered as programme parameters.

Initial data:
Number of areas (x*y).
Data going to the quality control unit:
Average density of the screening (C,M,Y,K) of each area.

6. Measurement of half-tone balance and critical colours

Location:
(1) The printed page is divided into colour zones in the vertical and horizontal directions of the page. The zones have equal widths. The number of zones is entered as a programme parameter. OR
(2) The x coordinates of each colour zone are entered as programme parameters.

One measuring point is specified from each zone.

Size of measuring point:
The minimum size of the rectangular measuring points is entered as programme parameter.

Types of measuring points:
The measuring points must be printed with the printing, that is processing, inks: cyan (C), magenta (M) and yellow (Y). The screening must be equal and within X1 to X2% for each colour.

Initial data:
Number of zones OR x coordinates of the zones (in mm);
Minimum size of measuring points (in mm*mm);
Allowed screening (in %) for each colour.
Data going to the quality control unit:
Coordinates of the measuring point (in mm);
Size of the measuring point (in mm*mm);
Screening (in %).

We claim:

1. A procedure for controlling printing quality, wherein the digital presentation of the page original is utilized, characterized in that
   (1) prior to printing, a plurality of measuring points are specified from the digital presentation of the page original on the basis of given initial data;
   (2) the initial data comprise one or several of the following specifications:
      areas are specified in which the details of the figures therein are distinctly salient from the near surroundings, such as being sharp density variations with strong contrast;
      at least one area of the page is specified in which a measuring point is sought;
      in that area of the page on which a measuring point is sought, the desired density level, such as the screen percentage, is specified;
      the desired measuring point size is determined;
      allowable tolerances are specified, such as the density level variation range and the allowable amount of other component colours deviating from the component colour under measurement;
   (3) the initial data for the measuring points are set so that at least two measuring points are locating points on the basis of which the other measuring points can be located on the printed page or in an equivalent area, and the other initial data are set according to which of the following measurements one desires to carry out: measurement of colour alignment, measurement of densities, measurement of microquality, measurement of half-tone balance, measurement of critical colour tones, and measurement of ink consumption quantity;
   (4) the locating points and other specified measuring points are found in the digital presentation of the page;
   (5) the detailed data of the measuring points associated with the page original are entered in a printing quality measuring unit;
   (6) on the printed page or equivalent the locating points are sought in conjunction with the proper measuring event, and on their basis the other measuring points are sought, the measurement is carried out and the results of measurement are entered in the quality measuring unit;
   (7) the results of measurement from the measuring points are compared with the measuring point data from the digital presentation of the page original, for determining the quality of printing; and
   (8) the results of comparison are used to adjust the printing machine.

2. Procedure according to claim 1, characterized in that the printed page or equivalent is imaged in a way known in the art with an electronic camera and the image is stored in memory in digital form; the locating points and other measuring points are sought in the image, these being analyzed in relation to the objective values of the measuring points in the page original, for determining the quality of printing.

3. Procedure according to claim 1 characterized in that the locating point is specified as an area, preferentially a rectangular area, containing details which do not occur in its adjacent areas, such as the border of an illustration, of a figure or a letter character, said locating point being used in aid of finding on the printed page or equivalent area the point corresponding to the locating point, by means of a suitable identifying method, and the locations of the other measuring points being determinable relative to said locating point, from the printed page or equivalent area.

4. Procedure according to claim 1 characterized in that in order to measure the density of each printer's ink colour that is being used the measuring points are specified in that the page or equivalent to be printed is divided into a number of colour zones vertically or horizontally and one or several measuring points per ink colour used are specified in each area in which the density of the respective ink colour is substantially constant and the density of other ink colours potentially present at the point of measurement is low, or at the most advantageous the measuring point is substantially free of any other ink colours.

5. Procedure according to claim 1 characterized in that for measuring the colour alignment the measuring points are specified in that the page or equivalent to be printed is divided into a plurality of colour zones vertically or horizontally and a number of measuring points is specified in which the printer's ink combinations are so selected that the alignment error for each ink colour can be measured in relation to black or to another reference colour.

6. Procedure according to claim 1 characterized in that for performing microscopic measurements the measuring points are specified in that the page or equivalent to be printed is divided into a plurality of colour zones vertically or horizontally and at each measuring point there occurs only one ink colour component, of which the screening is substantially constant within a given range of variation.

7. Procedure according to claim 1 characterized in that for measurement of colour distribution the page or equivalent to be printed is divided into a plurality of rectangular areas, their number being given, and the average density of the screening of each area is determined.

8. Procedure according to claim 1 characterized in that for measuring half-tone balance and/or critical colours the page or equivalent to be printed is divided into a plurality of colour zones vertically or horizontally and at each measuring point are used two or several process ink colours, such as cyan, magenta, yellow or black, and the screening of the measuring point is uniform within the allowed range of variation for each process colour.

9. Procedure according to claim 2, characterized in that the locating point is specified as an area, preferentially a rectangular area, containing details which do not occur in its adjacent areas, such as the border of an illustration, of a figure or a letter character, said locating point being used in aid of finding on the printed page or equivalent area the point corresponding to the locating point, by means of a suitable identifying method, and the locations of the other measuring points being determinable relative to said locating point, from the printed page or equivalent area.

10. Procedure according to claim 2, characterized in that in order to measure the density of each printer's ink color that is being used the measuring points are specified in that the page or equivalent to be printed is divided into a number of color zones vertically or horizontally and one or several measuring points per ink color used are specified in each area in which the density of the respective ink color is substantially constant and the density of other ink colors potentially present at the point of measurement is low, or at the most advantageous the measuring point is substantially free of any other ink colors.

11. Procedure according to claim 2, characterized in that for measuring the color alignment the measuring points are specified in that the page or equivalent to be printed is divided into a plurality of color zones vertically or horizontally and a number of measuring points is specified in which the printer's ink combinations are so selected that the alignment error for each ink color can be measured in relation to black or to another reference color.

12. Procedure according to claim 2, characterized in that for performing microscopic measurements the measuring points are specified in that the page or equivalent to be printed is divided into a plurality of color zones vertically or horizontally and at each measuring point there occurs only one ink color component, of which the screening is substantially constant within a given range of variation.

13. Procedure according to claim 2, characterized in that for measurement of color distribution the page or equivalent to be printed is divided into a plurality of rectangular areas, their number being given, and the average density of the screening of each area is determined.

14. Procedure according to claim 2, characterized in that for measuring half-tone balance and/or critical colors the page or equivalent to be printed is divided into a plurality of color zones vertically or horizontally and at each measuring point are used two or several process ink colors, such as cyan, magenta, yellow or black, and the screening of the measuring point is uniform within the allowed range of variation for each process color.

* * * * *